US012570479B2

(12) United States Patent
Fujihara et al.

(10) Patent No.: US 12,570,479 B2
(45) Date of Patent: Mar. 10, 2026

(54) SUPPLY APPARATUS

(71) Applicant: KABUSHIKI KAISHA TOSHIBA, Tokyo (JP)

(72) Inventors: Hiroaki Fujihara, Kawasaki Kanagawa (JP); Yasuhiro Ohkawa, Kawasaki Kanagawa (JP); Ippei Takaishi, Kawasaki Kanagawa (JP); Yuhi Minamino, Kawasaki Kanagawa (JP); Reiya Asanuma, Tokyo (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 71 days.

(21) Appl. No.: 18/604,892

(22) Filed: Mar. 14, 2024

(65) Prior Publication Data

US 2024/0217752 A1    Jul. 4, 2024

Related U.S. Application Data

(63) Continuation of application No. PCT/JP2022/034305, filed on Sep. 14, 2022.

(30) Foreign Application Priority Data

Sep. 21, 2021    (JP) .................................. 2021-153208

(51) Int. Cl.
*B65G 43/10*        (2006.01)
*B65G 43/08*        (2006.01)

(52) U.S. Cl.
CPC ............. *B65G 43/08* (2013.01); *B65G 43/10* (2013.01); *B65G 2203/041* (2013.01); *B65G 2203/042* (2013.01)

(58) Field of Classification Search
CPC .. B65G 43/08; B65G 43/10; B65G 2203/041; B65G 2203/042; B65G 47/68
See application file for complete search history.

(56) References Cited

U.S. PATENT DOCUMENTS

| 5,141,097 A | 8/1992 | Oiry et al. |
| 6,401,936 B1 | 6/2002 | Isaacs et al. |

(Continued)

FOREIGN PATENT DOCUMENTS

| EP | 2 375 380 B1 | 2/2014 |
| JP | 2005-145653 A | 6/2005 |

(Continued)

OTHER PUBLICATIONS

Japan Patent Office, Int'l Search Report in PCT/JP2022/034305, 2 pages (Dec. 6, 2022).

(Continued)

*Primary Examiner* — Gene O Crawford
*Assistant Examiner* — Lester Rushin, III
(74) *Attorney, Agent, or Firm* — Finnegan, Henderson, Farabow, Garrett & Dunner, LLP

(57) ABSTRACT

A supply apparatus according to an embodiment includes an input conveyor, a receiving conveyor, a camera, and a processor. The input conveyor is configured to input an article. The receiving conveyor is configured to receive the article that the input conveyor inputs. The camera is configured to photograph the article placed on the receiving conveyor. The processor is configured to extract an article region where the article appears, from a photography image that the camera photographs, calculate an area ratio that the article region indicates in the photography image, based on the article region, stop the input conveyor, based on the area ratio and set a stop time for stopping the input conveyor, based on the area ratio.

11 Claims, 9 Drawing Sheets

(56)         References Cited

U.S. PATENT DOCUMENTS

| | | | |
|---|---|---|---|
| 6,751,524 | B2 | 6/2004 | Neary et al. |
| 10,647,520 | B2 | 5/2020 | Hartmann et al. |
| 11,599,115 | B2 | 3/2023 | Kitamura |
| 2011/0240439 | A1 | 10/2011 | Rompe |
| 2016/0221762 | A1 | 8/2016 | Schroader |
| 2017/0312789 | A1 | 11/2017 | Schroader |
| 2019/0202642 | A1* | 7/2019 | Schroader .............. B65G 43/10 |
| 2021/0129334 | A1* | 5/2021 | Kanunikov ............ B65G 61/00 |
| 2021/0171291 | A1* | 6/2021 | Green .................... B65G 47/64 |
| 2022/0081221 | A1* | 3/2022 | Beuchert ............. B65G 41/003 |
| 2023/0249920 | A1 | 8/2023 | Asanuma |
| 2023/0348199 | A1 | 11/2023 | Torii et al. |

FOREIGN PATENT DOCUMENTS

| | | | |
|---|---|---|---|
| JP | 4297265 | * | 7/2009 |
| JP | 4297265 | B2 | 7/2009 |
| JP | 2011-227393 | A | 11/2011 |
| JP | 5464177 | B2 | 4/2014 |
| JP | 2018-507149 | A | 3/2018 |
| JP | 2020-529303 | A | 10/2020 |
| JP | 2020-194345 | A | 12/2020 |
| JP | 2021-167228 | A | 10/2021 |
| JP | 2022-105395 | A | 7/2022 |

OTHER PUBLICATIONS

European Patent Office, Extended European Search Report issued in EP App. No. 22872786.3 (Aug. 21, 2025).

\* cited by examiner

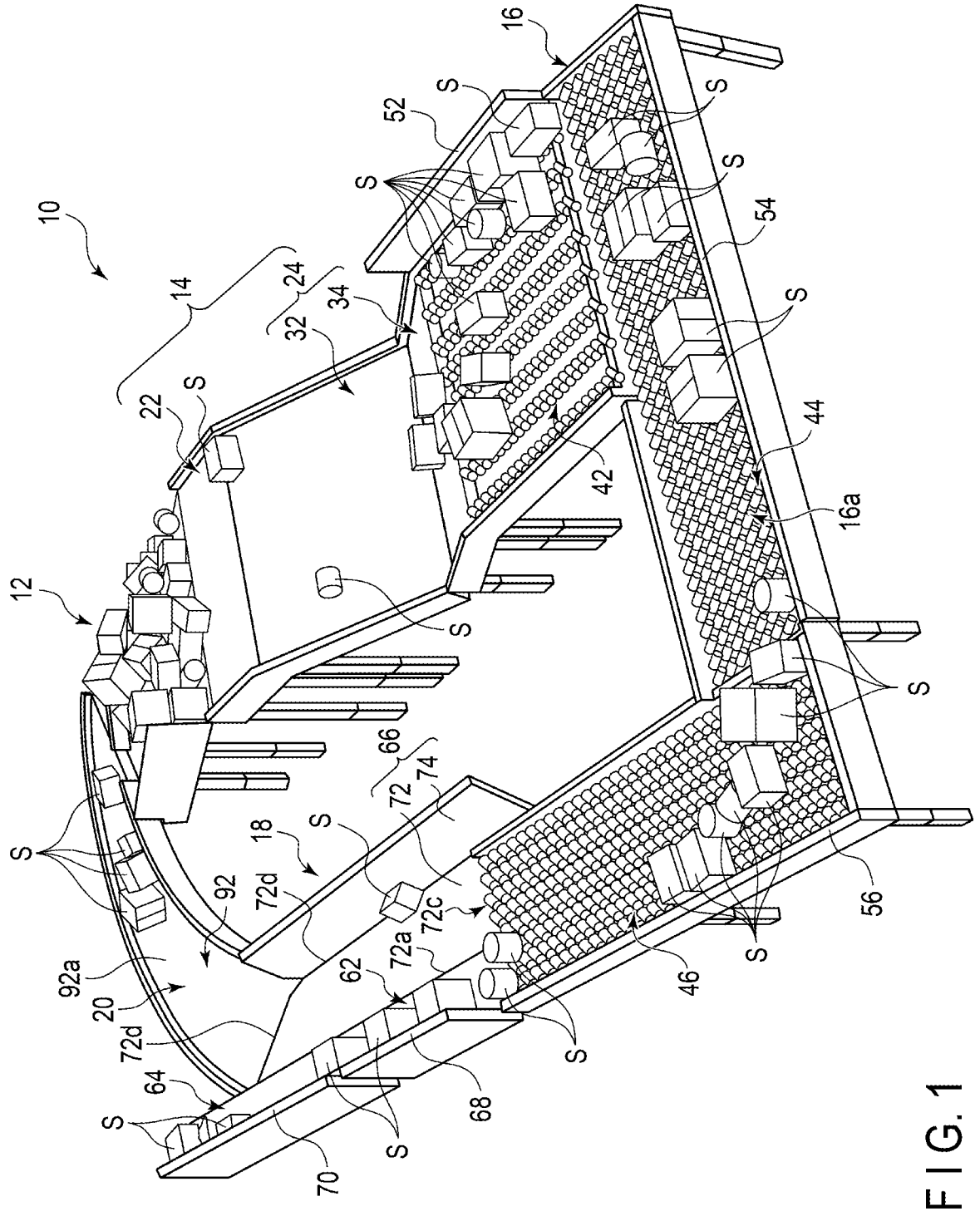
F I G. 1

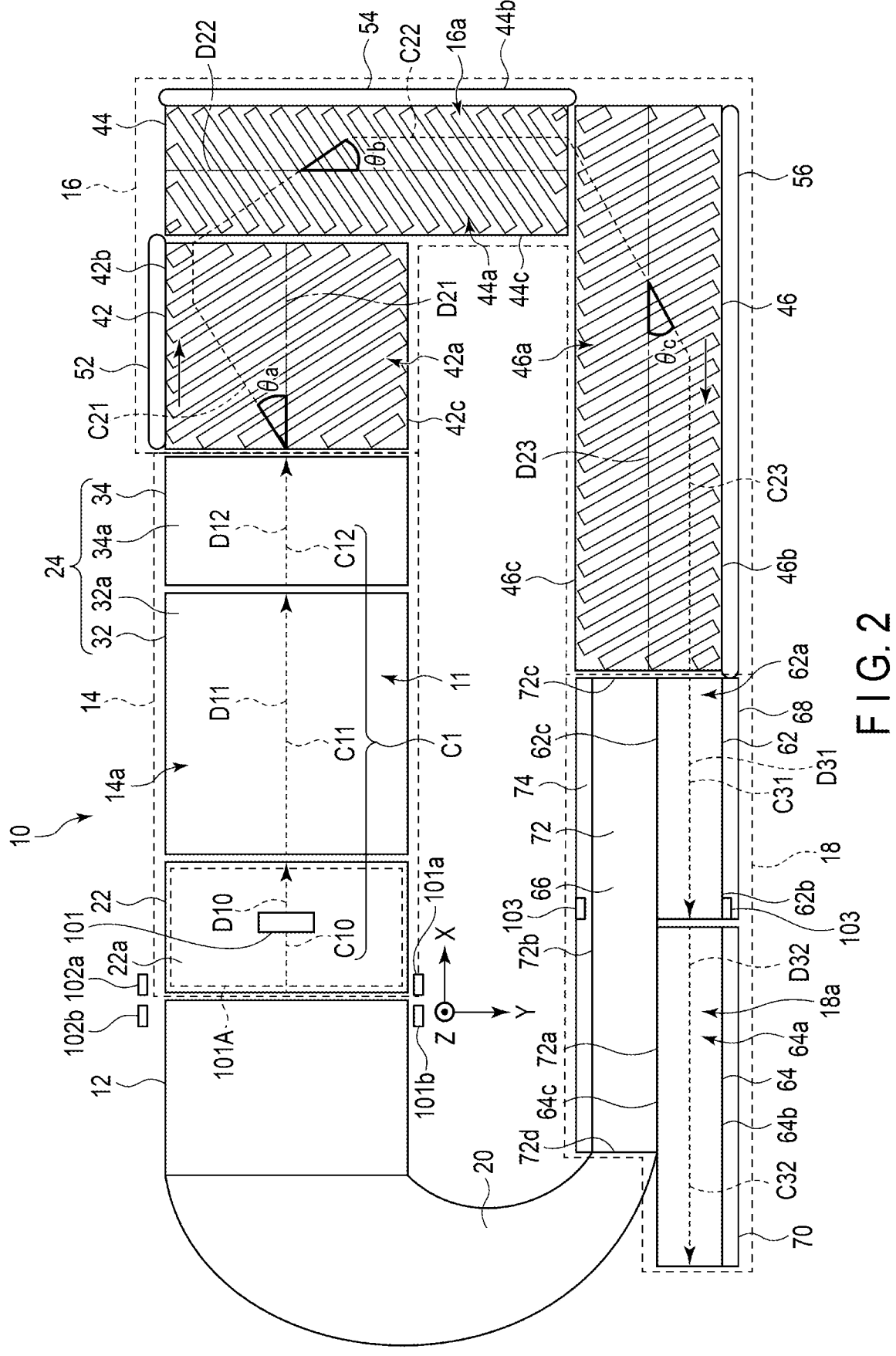
F I G. 2

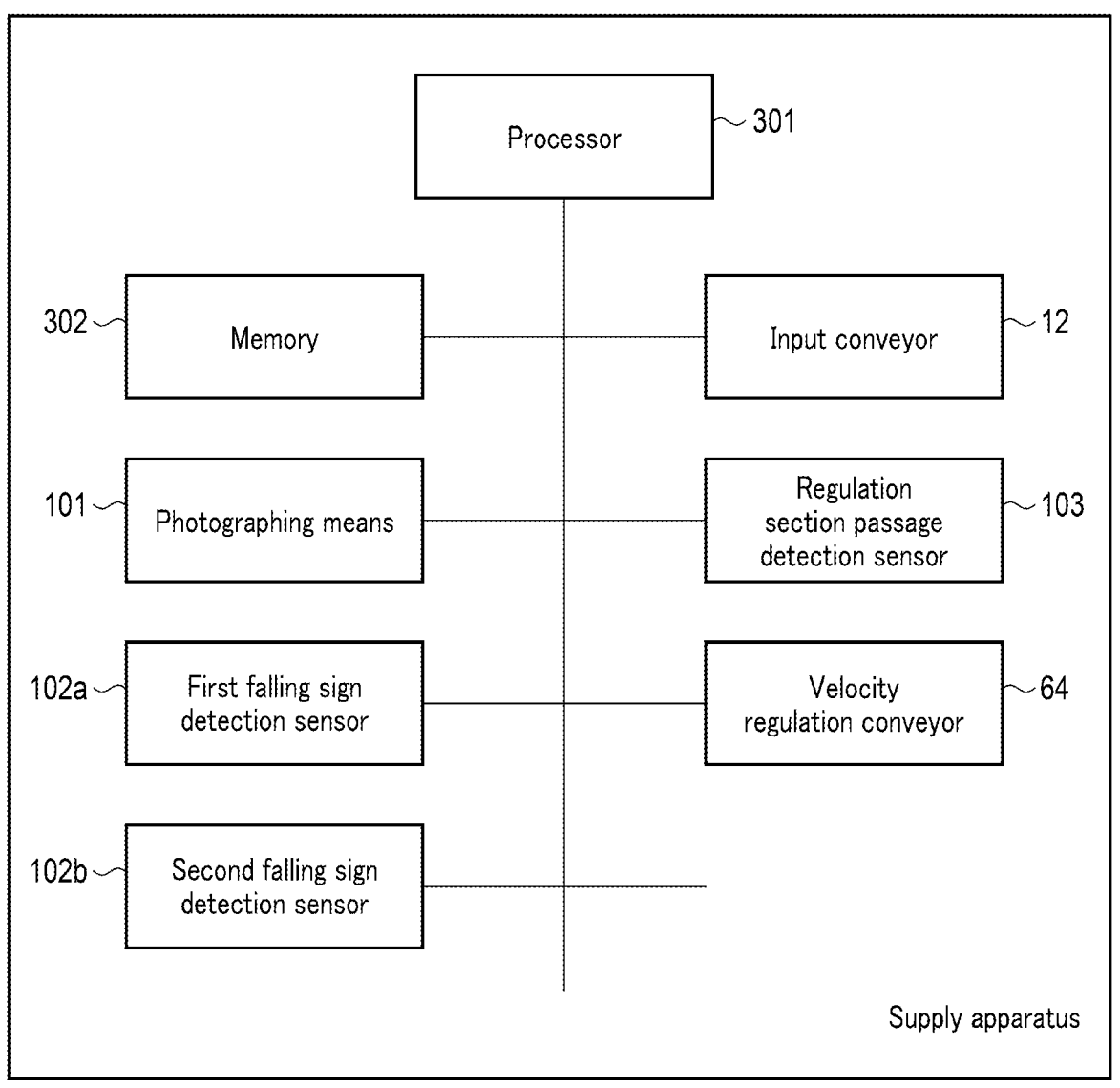
F I G. 5

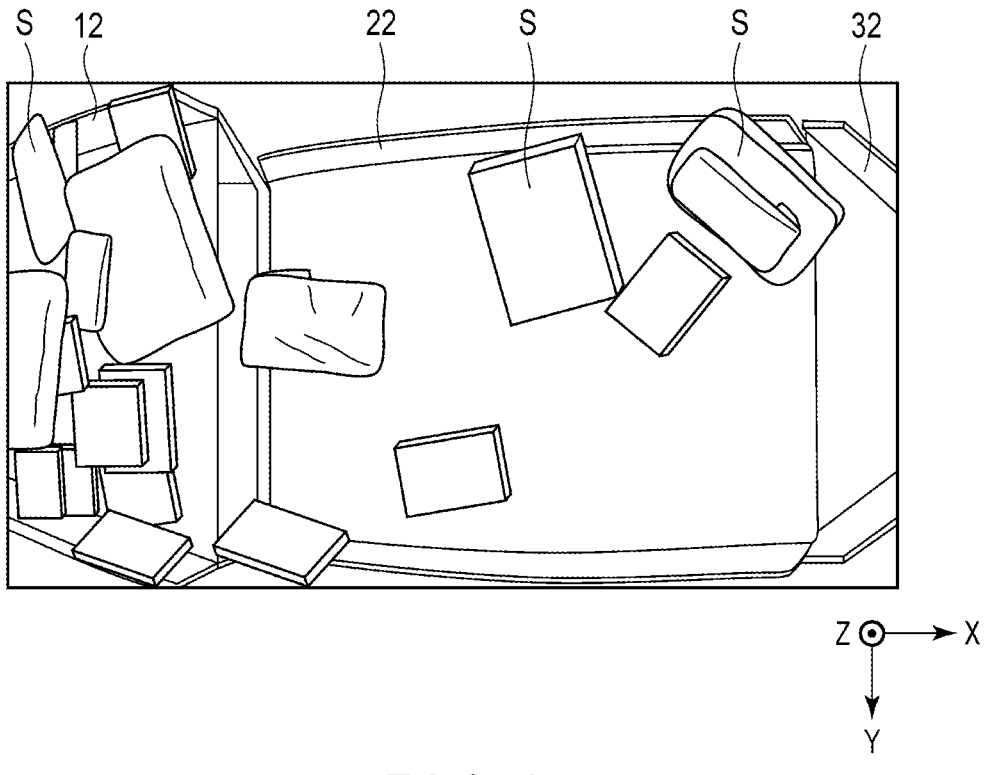
F I G. 6
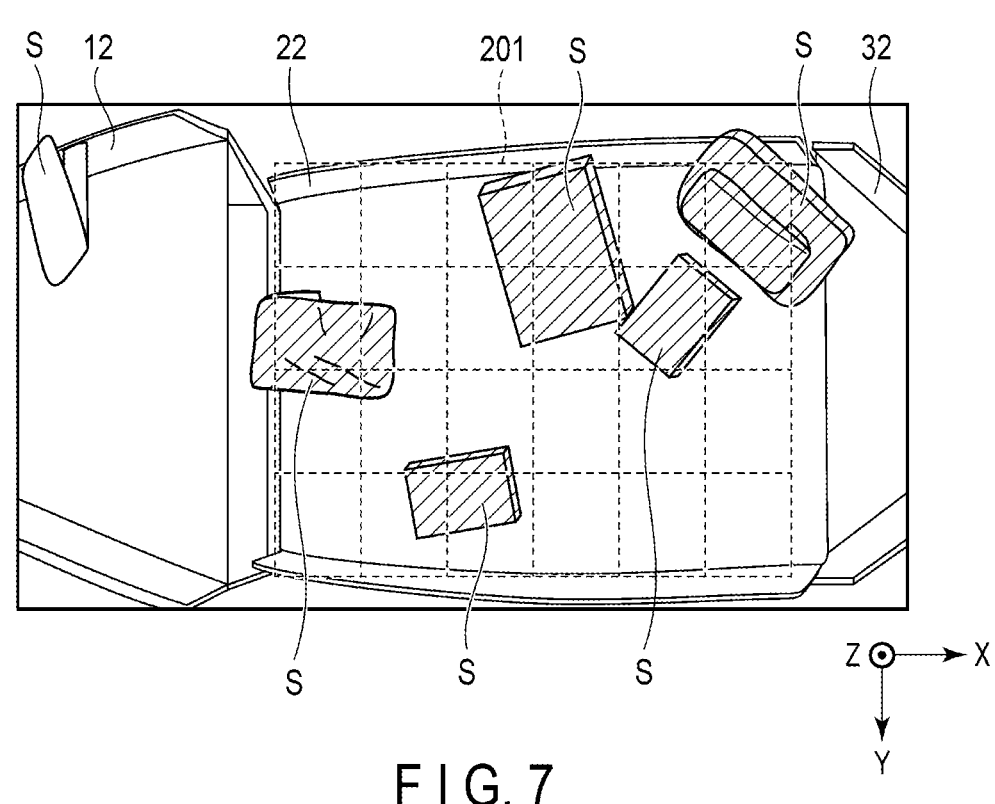
F I G. 7

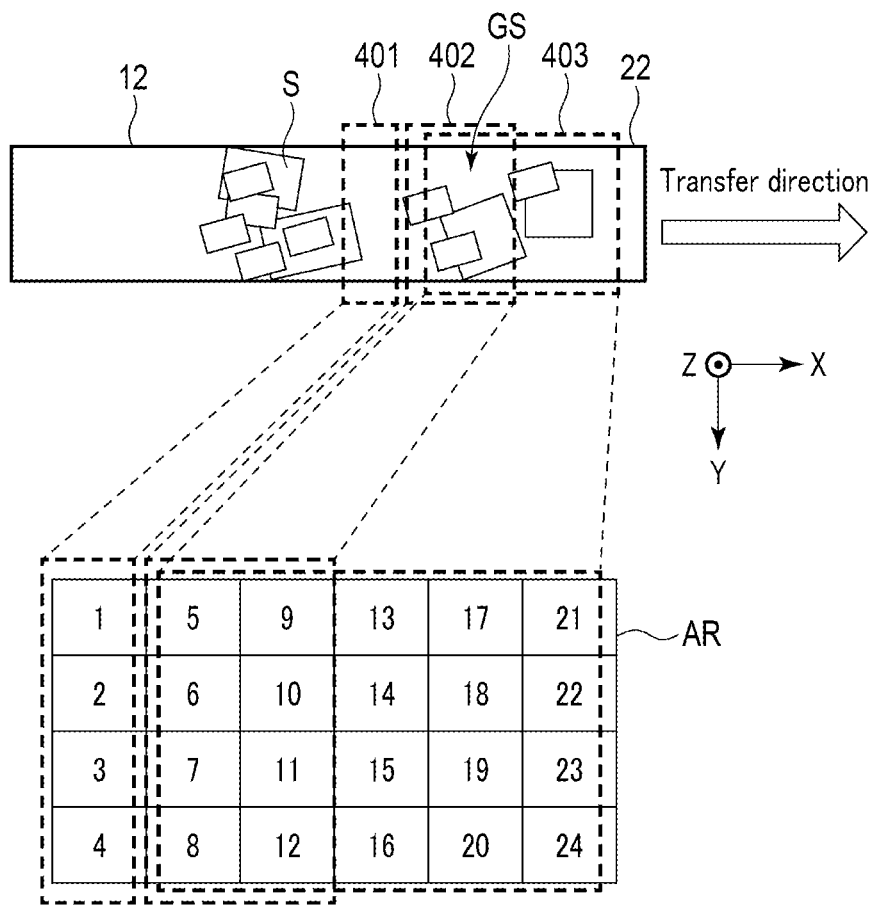
F I G. 8

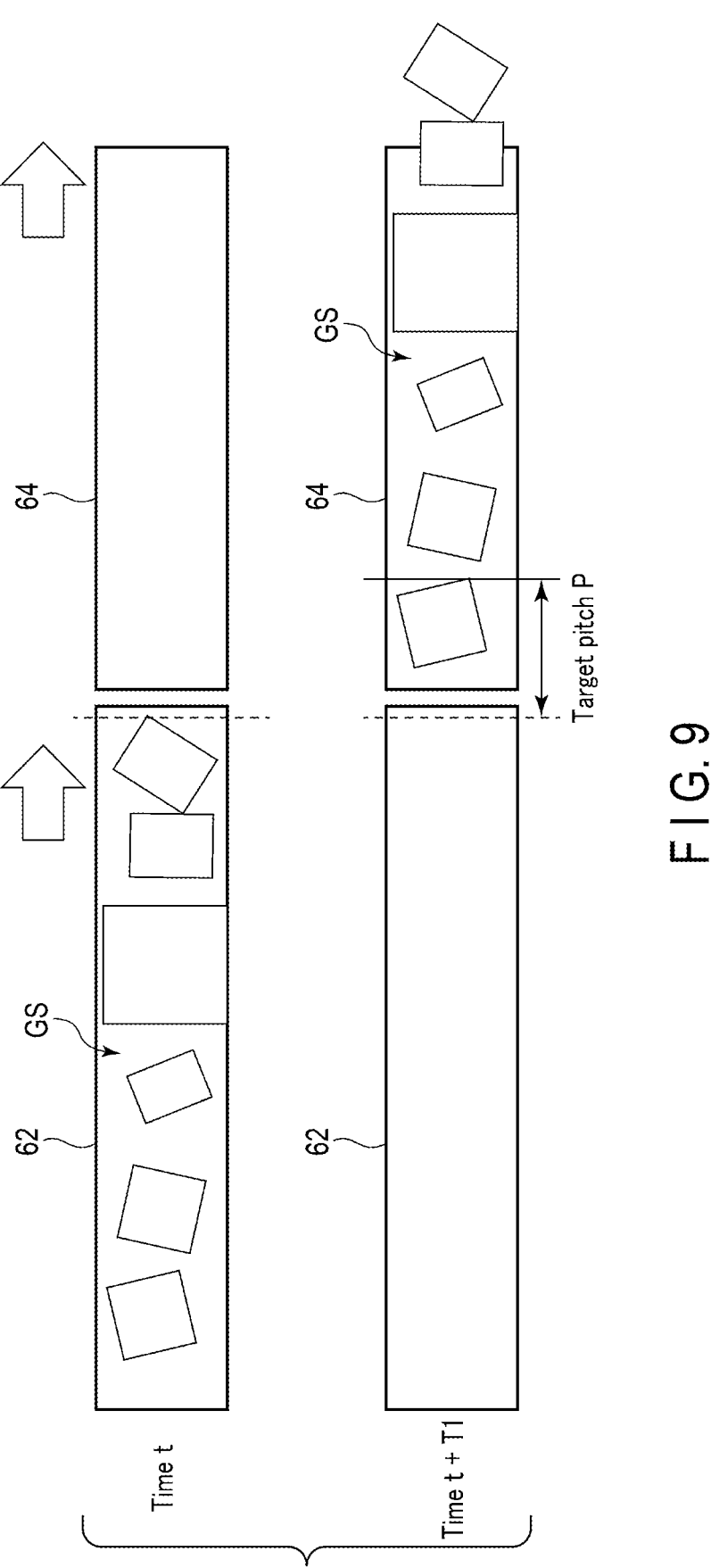
F I G. 9

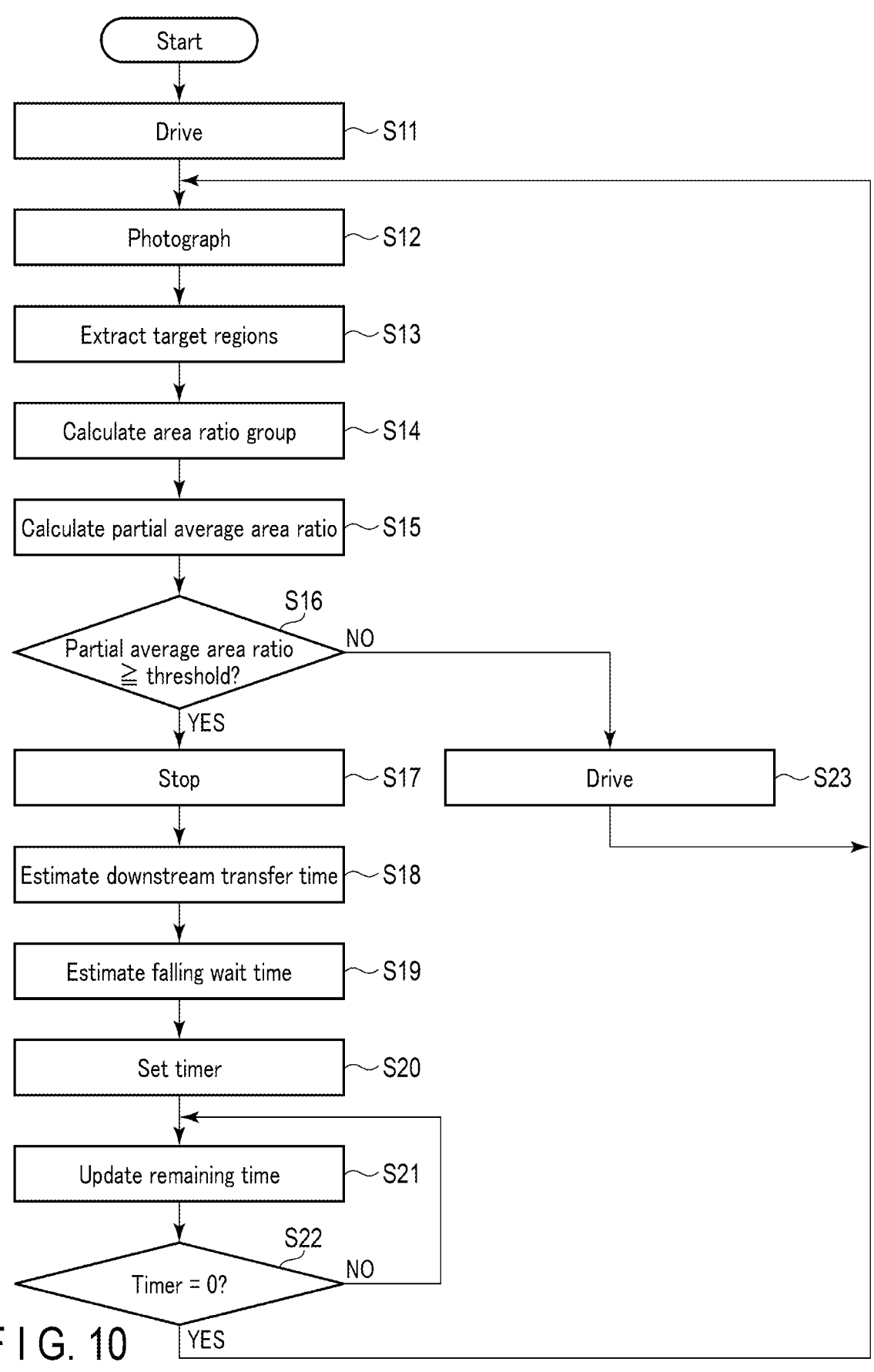
F I G. 10

SUPPLY APPARATUS

CROSS REFERENCE TO RELATED APPLICATIONS

This application is a Continuation Application of PCT Application No. PCT/JP2022/034305, filed Sep. 14, 2022 and based upon and claiming the benefit of priority from Japanese Patent Application No. 2021-153208, filed Sep. 21, 2021, the entire contents of all of which are incorporated herein by reference.

FIELD

Embodiments of the present invention relate to a supply apparatus.

BACKGROUND

There has been provided a supply apparatus that supplies input articles by arranging the articles at predetermined intervals. Such a supply apparatus spaces apart articles that overlap each other, or articles that are input in a lump, while transferring the articles by a conveyor or the like.

It is desired for the supply apparatus to maintain a predetermined throughput (the amount of articles supplied per unit time).

However, in some cases, the throughput is not stable because of the sizes of articles or the amount of input goods.

BRIEF DESCRIPTION OF THE DRAWINGS

FIG. 1 is a schematic perspective view illustrating an operation state of a supply apparatus according to an embodiment.

FIG. 2 is a schematic view illustrating a state in which the supply apparatus according to the embodiment is viewed from above.

FIG. 5 is a block diagram illustrating a control system of the supply apparatus according to the embodiment.

FIG. 6 is a view illustrating an example of a photography image according to the embodiment.

FIG. 7 is a view illustrating an operation example in which the supply apparatus according to the embodiment calculates an area ratio.

FIG. 8 is a view illustrating an operation example of the supply apparatus according to the embodiment.

FIG. 9 is a view illustrating an operation example of the supply apparatus according to the embodiment.

FIG. 10 is a flowchart illustrating an operation example of the supply apparatus according to the embodiment.

DETAILED DESCRIPTION

A supply apparatus according to an embodiment includes an input conveyor, a receiving conveyor, a camera, and a processor. The input conveyor is configured to input an article. The receiving conveyor is configured to receive the article that the input conveyor inputs. The camera is configured to photograph the article placed on the receiving conveyor. The processor is configured to extract an article region where the article appears, from a photography image that the camera photographs, calculate an area ratio that the article region indicates in the photography image, based on the article region, stop the input conveyor, based on the area ratio and set a stop time for stopping the input conveyor, based on the area ratio.

Hereinafter, a supply apparatus 10 is described with reference to the drawings.

The supply apparatus 10 spaces apart (separates) goods stacked in multiple layers, and, for example, in a physical distribution system, supplies articles (processing targets) at predetermined time intervals (at predetermined pitches) to, for example, a sorting device that sorts the articles by destination. In addition, for example, the supply apparatus 10 may be provided in a part of a manufacturing line, and may space apart (separate) the same kind of, or different kinds of, many parts (processing targets), and may supply the parts (processing targets) to a rear-stage device at predetermined time intervals (at predetermined pitches).

The supply apparatus 10 according to the embodiment is described with reference to FIG. 1 to FIG. 4.

Figure 3:
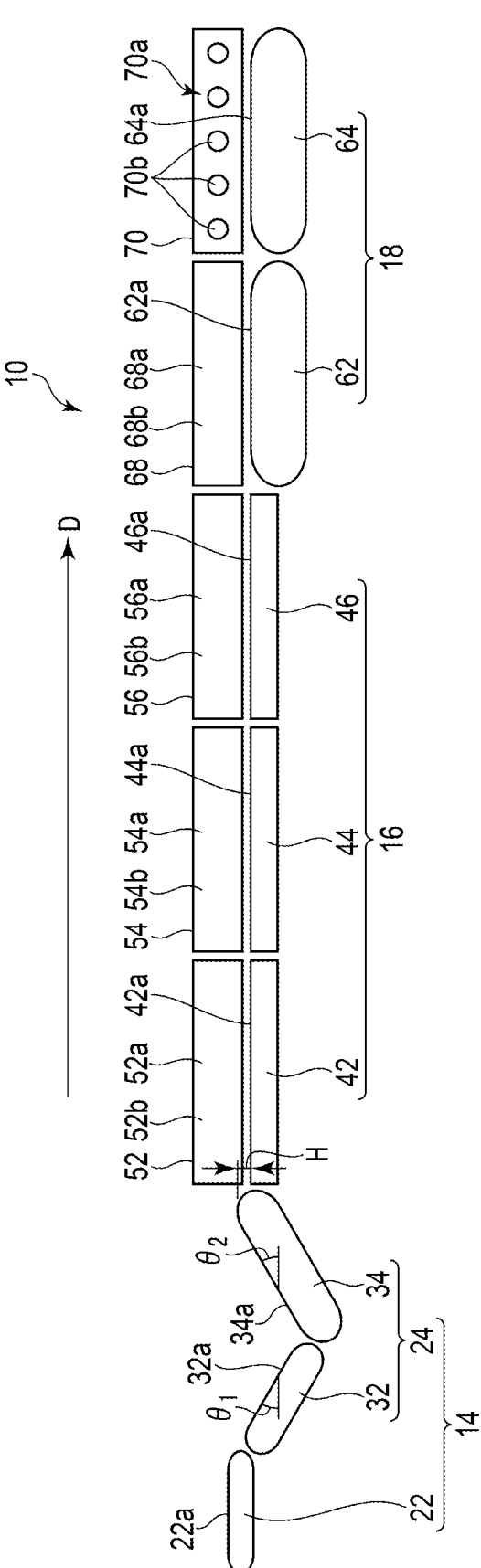
FIG. 3 is a schematic view illustrating a state of a transfer path along an extending direction in which a transfer path of the supply apparatus according to the embodiment extends.
Figure 4:
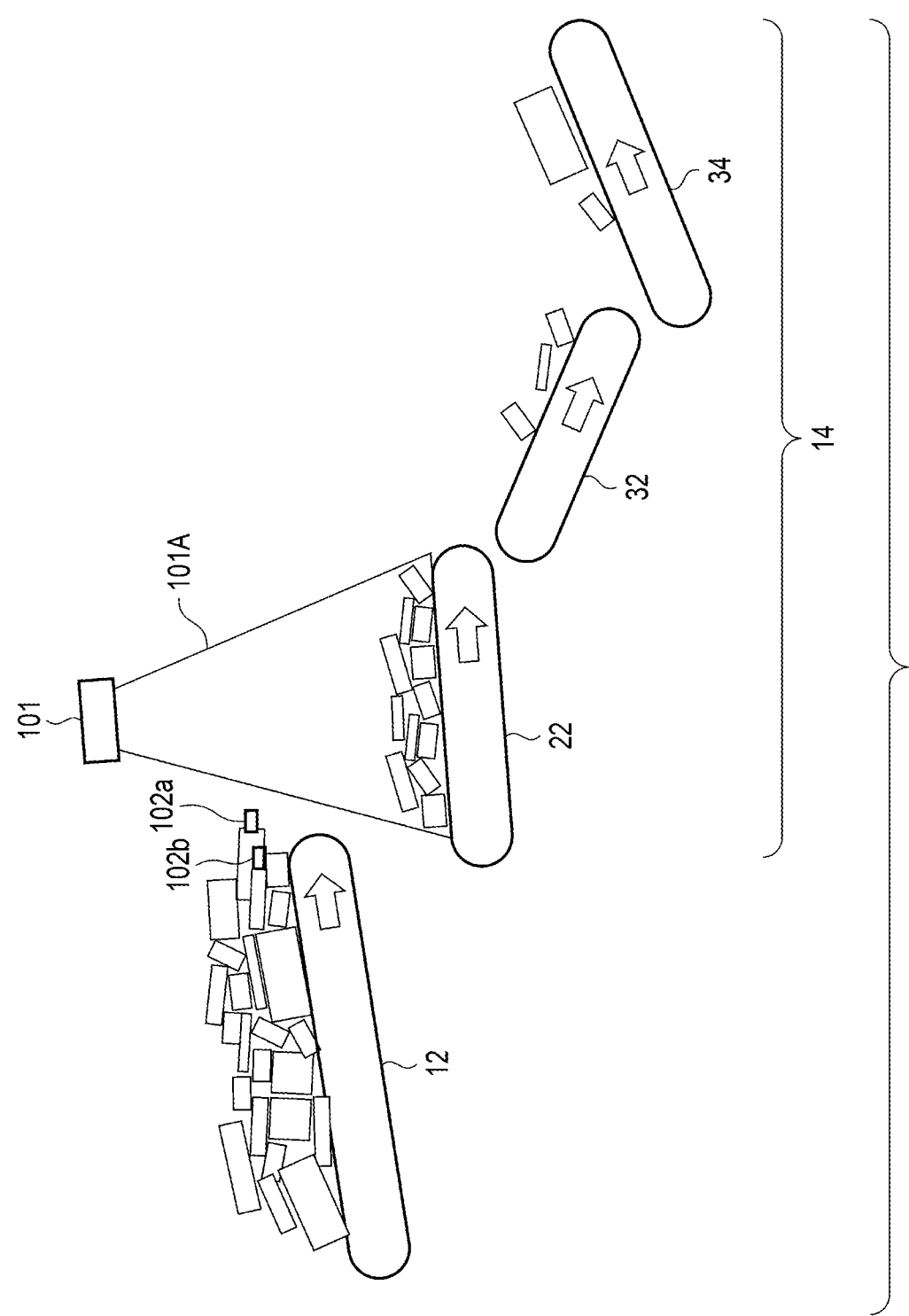
FIG. 4 is a schematic view illustrating an input conveyor, a first transfer unit, and so on of the supply apparatus according to the embodiment.

FIG. 1 is a schematic perspective view illustrating an operation state of the supply apparatus 10. FIG. 2 is a schematic view illustrating a state in which the supply apparatus 10 illustrated in FIG. 1 is viewed from above. An XYZ orthogonal coordinate system is defined for the supply apparatus 10 in FIG. 2. FIG. 3 illustrates a state in which an outer side (one direction) is viewed from an inner side (the other direction) of end portions in a width direction perpendicular to an extending direction of a transfer path. Thus, FIG. 3 is a schematic view illustrating inclined states and differences in altitude of the transfer paths along extending directions D, in a case of assuming that the extending directions D (D10, D11, D12, D21, D22, D23, D31, D32) of the successive transfer paths of the supply apparatus 10 in FIG. 2 are straightened. In addition, FIG. 4 is a schematic view illustrating a positional relationship between an input conveyor 12, a first transfer unit 14, and photographing means 101.

As illustrated in FIG. 1 and FIG. 2, the supply apparatus 10 includes an input conveyor 12 to which a plurality of processing targets S are input, a first transfer unit 14, a second transfer unit 16, and a third transfer unit 18.

The input conveyor 12 is a conveyor that inputs the processing targets S to the first transfer unit 14. For example, the processing targets S, which are input by a robot, an operator or a curve conveyor 92, are placed on the input conveyor 12. The input conveyor 12 transfers the placed processing targets S, and inputs the processing targets S from a downstream end of the input conveyor 12 to an upstream end of a first transfer path 14a.

Note that in the present embodiment, an upstream-side end portion of the transfer path itself is defined as an upstream end, and a downstream-side end portion is defined as a downstream end.

The first transfer unit 14 includes the first transfer path 14a that transfers the processing targets S from the upstream side to the downstream side along a first transfer direction C1 (C10, C11, C12). As illustrated in FIG. 2, the extending directions D10, D11 and D12 of the first transfer unit 14 are apparently straight as a whole along an X axis. However, as illustrated in FIG. 3, the extending directions D11 and D12 are inclined with respect to the X axis and a Z axis along a ZX plane. The extending directions D11 and D12 are inclined with respect to a horizontal plane (the ground).

The second transfer unit 16 is disposed on the downstream side of the first transfer path 14a of the first transfer unit 14, and includes a second transfer path 16a that is bent, for example, in a U shape (including a J shape). The second transfer path 16a of the second transfer unit 16 transfers the processing targets S from the upstream side to downstream side along second transfer directions C21, C22 and C23.

The third transfer unit 18 is disposed on the downstream side of the second transfer path 16a, and includes a third transfer path 18a that transfers the processing targets S from the upstream side to downstream side along a third transfer direction C32. The third transfer unit 18 is straight along the X axis direction. A sorting device, for example, is disposed on the downstream side of the third transfer unit 18.

As illustrated in FIG. 2, when the supply apparatus 10 is viewed from above, the first transfer unit 14 and the third transfer unit 18 are spaced apart in a Y axis direction. Thus, the first transfer unit 14 and the third transfer unit 18 are opposed to each other with a space therebetween. A horizontal component of the first transfer direction C1 of the first transfer path 14a and a horizontal component of the third transfer direction C32 of the third transfer path 18a are straight. The horizontal component of the first transfer direction C1 of the first transfer path 14a and the horizontal component of the third transfer direction C32 of the third transfer path 18a are parallel (including a case of being substantially parallel), and are directed in opposite directions.

The first transfer unit 14 includes a first conveyor 22 (receiving conveyor) neighboring the downstream side of the input conveyor 12 along the X axis, and a second conveyor unit 24 disposed on the downstream side of the first conveyor 22 along the X axis.

The first conveyor 22 receives the processing targets S that the input conveyor 12 inputs. In the present embodiment, the first conveyor 22 includes, for example, by an endless belt, a transfer path 22a that is horizontal to the horizontal plane (the ground). The second conveyor unit 24 includes a first inclined conveyor 32 including, for example, by an endless belt, a transfer path 32a inclining as a downward slope with respect to the horizontal plane, and includes a second inclined conveyor 34 including, for example, by an endless belt, a transfer path 34a inclining as an upward slope with respect to the horizontal plane. The first inclined conveyor 32 neighbors the downstream side of the first conveyor 22. The second inclined conveyor 34 neighbors the downstream side of the first inclined conveyor 32. The first inclined conveyor 32 inclines downward along the first transfer direction C1 by the downward slope. The second inclined conveyor 34 inclines upward along the first transfer direction C1 by the upward slope.

A transfer velocity V10 along the transfer direction C10 of the transfer path 22a of the first conveyor 22 is equal to or higher than a transfer velocity V11 along the transfer direction C11 of the transfer path 32a of the first inclined conveyor 32 of the second conveyor unit 24. A transfer velocity V12 along the transfer direction C12 of the transfer path 34a of the second inclined conveyor 34 of the second conveyor unit 24 is equal to or higher than the transfer velocity V11 along the transfer direction C11 of the transfer path 32a of the first inclined conveyor 32 of the second conveyor unit 24.

Preferably, an inclination angle θ1 illustrated in FIG. 3 of the transfer path 32a of the first inclined conveyor 32 with respect to the horizontal plane is, for example, about 10° to 40°. Preferably, an inclination angle θ2 of the transfer path 34a of the second inclined conveyor 34 with respect to the horizontal plane is, for example, about 10° to 40°.

Preferably, in an area between the downstream end of the transfer path 22a of the first conveyor 22 and the upstream end of the first inclined conveyor 32, the upstream end of the transfer path 32a of the first inclined conveyor 32 is situated slightly on the lower side. In this case, the processing targets S can easily be transferred between the transfer path 22a of the first conveyor 22 and the transfer path 32a of the first inclined conveyor 32.

As illustrated in FIG. 2 and FIG. 4, a first falling sign detection sensor 102a and a second falling sign detection sensor 102b are formed at the upstream end of the input conveyor 12.

The first falling sign detection sensor 102a detects the processing target S that is about to fall from the input conveyor 12 onto the transfer path 22a. In other words, the first falling sign detection sensor 102a detects a sign of falling (a timing immediately before falling) of the processing target S.

The first falling sign detection sensor 102a detects the processing target S further on the downstream side than the downstream end of the input conveyor 12. In other words, the first falling sign detection sensor 102a detects the processing target S protruding from the downstream end of the input conveyor 12. The first falling sign detection sensor 102a outputs a first detection result to a processor 301 as the result of detection.

For example, the first falling sign detection sensor 102a is composed of a light source that radiates light such as infrared, and a detector that detects light from the light source. If light from the light source to the detector is blocked, the first falling sign detection sensor 102a detects the processing target S.

Similarly, the second falling sign detection sensor 102b detects the processing target S that is about to fall from the input conveyor 12 onto the transfer path 22a. In other words, the second falling sign detection sensor 102b detects a sign of falling (a timing immediately before falling) of the processing target S. The second falling sign detection sensor 102b detects the processing target S at a position further on the upstream side than the position where the first falling sign detection sensor 102a detects the processing target S. Here, the second falling sign detection sensor 102b detects the processing target S existing at the downstream end of the input conveyor 12. The second falling sign detection sensor 102b outputs a second detection result to the processor 301 as the result of detection.

Since the structure of the second falling sign detection sensor 102b is similar to the structure of the first falling sign detection sensor 102a, a description thereof is omitted.

In addition, as illustrated in FIG. 2 and FIG. 4, photographing means 101 is formed above the first conveyor 22.

The photographing means 101 is disposed in such a manner as to photograph a downward side. In other words, the photographing means 101 photographs the first conveyor 22 from above. For example, the photographing means 101 is composed of an illumination, a camera, and so on.

Here, the photographing means 101 photographs a photography region 101A in the first conveyor 22.

As illustrated in FIG. 1 and FIG. 2, the second transfer unit 16 includes a first bias conveyor 42 neighboring the downstream side of the first transfer unit 14 along the X axis, a second bias conveyor 44, and a third bias conveyor 46. In the second transfer unit 16, the first bias conveyor 42, second bias conveyor 44 and third bias conveyor 46 are connected in such a way as to have mutually different extending directions D21, D22 and D23 and transfer directions C21, C22 and C23. The extending directions D21, D22 and D23 of the first bias conveyor 42, second bias conveyor 44 and third bias conveyor 46 of the second transfer unit 16 are in a U shape as a whole. It suffices that the first bias conveyor 42, second bias conveyor 44 and third bias conveyor 46 are arranged to neighbor each other, and it is not necessary to integrate these conveyors as one conveyor.

The first bias conveyor 42 of the second transfer unit 16 is disposed along the first transfer direction C1 on the downstream side of the first transfer unit 14. The second bias conveyor 44 is disposed in a direction crossing the first bias conveyor 42 on the downstream side of the first bias conveyor 42. The third bias conveyor 46 is disposed in a direction crossing the second bias conveyor 44 on the downstream side of the second bias conveyor 44.

When the supply apparatus 10 is viewed from above, as illustrated in FIG. 2, the first bias conveyor 42 extends along the extending direction D21. The extending direction D21 of the first bias conveyor 42 substantially agrees with a horizontal component of the first transfer direction C1. A transfer path 42*a* of the first bias conveyor 42 is, for example, parallel to the XY plane. The transfer direction C21 of the processing target S by the transfer path 42*a* of the first bias conveyor 42 deviates from the horizontal component of the first transfer direction C1. For example, an oblique roller conveyor is used as the first bias conveyor 42. The transfer direction C21 inclines by an inclination angle θa with respect to the extending direction D21 of the transfer path 42*a* of the first bias conveyor 42. Preferably, the inclination angle θa is, for example, about 10° to 40°. Thus, the first bias conveyor 42 can move the processing target S, which is placed on the transfer path 42*a* of the first bias conveyor 42, toward one direction of a width direction perpendicular to the extending direction D21, i.e., toward an outer end portion 42*b* in one direction.

If a transfer velocity along the transfer direction C21 by the transfer path 42*a* of the first bias conveyor 42 is V21, the transfer path 42*a* of the first bias conveyor 42 moves the processing target S along the extending direction D21 of the first bias conveyor 42 at a velocity of V21·cos θa. Preferably, the transfer velocity V21 along the transfer direction C21 of the transfer path 42*a* of the first bias conveyor 42 is higher than the transfer velocity V12 along the transfer direction C12 of the transfer path 34*a* of the second inclined conveyor 34.

The outer end portion 42*b* in one direction of the width direction perpendicular to the extending direction D21 of the first bias conveyor 42 is provided with a first wall unit 52 that functions as a wall for preventing the processing target S from falling from one direction of the first bias conveyor 42. The first wall unit 52 extends, for example, in parallel to the extending direction D21 of the transfer path 42*a* of the first bias conveyor 42. The presence of the first wall unit 52 prevents the processing target S from falling from an end portion in one direction of the first bias conveyor 42.

The first wall unit 52 includes an auxiliary transfer unit 52*a* that actively or passively transfers the processing target S along the first extending direction D21 from the upstream side toward downstream side of the transfer path 42*a* of the first bias conveyor 42. The auxiliary transfer unit 52*a* of the first wall unit 52 is directed toward an inner end portion 42*c* in the other direction of the width direction perpendicular to the extending direction D21 of the first bias conveyor 42.

Here, a description is given of, by way of example, a case where the auxiliary transfer unit 52*a* of the first wall unit 52 actively transfers the processing target S along the first extending direction D21 from the upstream side toward downstream side of the transfer path 42*a* of the first bias conveyor 42.

The auxiliary transfer unit 52*a* includes an endless belt that is similar to, for example, an endless belt used in a belt conveyor. A normal direction of a transfer surface 52*b* of the endless belt is, for example, horizontal, and is direction to the inner side (the other direction) of the width direction. The transfer surface 52*b* of the endless belt of the auxiliary transfer unit 52*a* operates in such a manner as to move the processing target S in parallel to the first extending direction D21 from the upstream side to downstream side, for example, at a velocity of V21·cos θa.

As illustrated in FIG. 3, preferably, a step H of, for example, about 10 cm is formed between the downstream end of the second inclined conveyor 34 and the upstream end of the first bias conveyor 42.

The second bias conveyor 44 extends in a direction along the Y axis that is, for example, perpendicular to the extending direction D21 (direction along the X axis) of the first bias conveyor 42. A transfer path 44*a* of the second bias conveyor 44 is, for example, parallel to the XY plane. For example, an oblique roller conveyor is used as the second bias conveyor 44. The transfer direction C22 of the second bias conveyor 44 inclines by an inclination angle θb with respect to the extending direction D22 of the second bias conveyor 44. Preferably, the inclination angle θb is, for example, about 10° to 40°. Thus, the second bias conveyor 44 can move the processing target S, which is placed on the transfer path 44*a* of the second bias conveyor 44, toward one direction of a width direction perpendicular to the extending direction D22, i.e., toward an outer end portion 44*b* in one direction.

If a transfer velocity along the transfer direction C22 by the transfer path 44*a* of the second bias conveyor 44 is V22, the transfer path 44*a* of the second bias conveyor 44 operates in such a manner as to move the processing target S along the extending direction D22 of the second bias conveyor 44 at a velocity of V22·cos θb (≥V21·cos θa). Preferably, the transfer velocity V22 along the transfer direction C22 of the transfer path 44*a* of the second bias conveyor 44 is higher than the transfer velocity V21 along the transfer direction C21 of the transfer path 42*a* of the first bias conveyor 42.

The outer end portion 44*b* in one direction of the width direction perpendicular to the extending direction D22 of the second bias conveyor 44 is provided with a second wall unit 54 that functions as a wall for preventing the processing target S from falling from one direction of the second bias conveyor 44. The second wall unit 54 extends, for example, in parallel to the extending direction D22 of the transfer path 44*a* of the second bias conveyor 44. The presence of the second wall unit 54 prevents the processing target S from falling from the second bias conveyor 44.

The second wall unit 54 includes an auxiliary transfer unit 54*a* that actively or passively transfers the processing target S along the second extending direction D22 from the upstream side toward downstream side of the transfer path 44*a* of the second bias conveyor 44. The auxiliary transfer unit 54*a* of the second wall unit 54 is directed toward an inner end portion 44*c* in the other direction of the width direction perpendicular to the extending direction D22 of the second bias conveyor 44.

Here, a description is given of, by way of example, a case where the auxiliary transfer unit 54*a* of the second wall unit 54 actively transfers the processing target S along the second extending direction D22 from the upstream side toward downstream side of the transfer path 44a of the second bias conveyor 44.

The auxiliary transfer unit 54a is formed, for example, like the auxiliary transfer unit 52a. Thus, a transfer surface 54b of the endless belt of the auxiliary transfer unit 54a operates in such a manner as to move the processing target S in parallel to the second extending direction D22 from the upstream side to downstream side, for example, at a velocity of V22·cos θb.

The third bias conveyor 46 neighbors the downstream side of the second bias conveyor 44 along the Y axis. The third bias conveyor 46 extends in a direction that is, for example, perpendicular to the extending direction D22 of the second bias conveyor 44. A transfer path 46a of the third bias conveyor 46 is, for example, parallel to the XY plane. For example, an oblique roller conveyor is used as the third bias conveyor 46. The transfer direction C23 of the third bias conveyor 46 inclines by an inclination angle θc with respect to the extending direction D23 of the third bias conveyor 46. Preferably, the inclination angle θc is, for example, about 10° to 40°. Thus, the third bias conveyor 46 can move the processing target S, which is placed on the transfer path 46a of the third bias conveyor 46, toward one direction of a width direction perpendicular to the extending direction D23, i.e., toward an outer end portion 46b in one direction.

If a transfer velocity along the transfer direction C23 by the transfer path 46a of the third bias conveyor 46 is V23, the transfer path 46a of the third bias conveyor 46 operates in such a manner as to move the processing target S along the extending direction D23 of the third bias conveyor 46 at a velocity of V23·cos θc (≥V22·cos θb). Preferably, the transfer velocity V23 along the transfer direction C23 of the transfer path 46a of the third bias conveyor 46 is higher than the transfer velocity V22 along the transfer direction C22 of the transfer path 44a of the second bias conveyor 44.

The outer end portion 46b in one direction of the width direction perpendicular to the extending direction D23 of the third bias conveyor 46 is provided with a third wall unit 56 that functions as a wall for preventing the processing target S from falling from one direction of the third bias conveyor 46. The third wall unit 56 extends, for example, in parallel to the extending direction D23 of the transfer path 46a of the third bias conveyor 46. The presence of the third wall unit 56 prevents the processing target S from falling from the third bias conveyor 46.

The third wall unit 56 includes an auxiliary transfer unit 56a that actively or passively transfers the processing target S along the third extending direction D23 from the upstream side toward downstream side of the transfer path 46a of the third bias conveyor 46. The auxiliary transfer unit 56a of the third wall unit 56 is directed toward an inner end portion 46c in the other direction of the width direction perpendicular to the extending direction D23 of the third bias conveyor 46.

Here, a description is given of, by way of example, a case where the auxiliary transfer unit 56a of the third wall unit 56 actively transfers the processing target S along the third extending direction D23 from the upstream side toward downstream side of the transfer path 46a of the third bias conveyor 46.

The auxiliary transfer unit 56a is formed, for example, like the auxiliary transfer units 52a and 54a. Thus, a transfer surface 56b of the endless belt of the auxiliary transfer unit 56a operates in such a manner as to move the processing target S in parallel to the second extending direction D23 from the upstream side to downstream side, for example, at a velocity of V23·cos θc.

The third transfer unit 18 includes a small-width conveyor 62 (downstream conveyor), a velocity regulation conveyor 64, and a recovery unit 66. In the third transfer unit 18, for example, a camera (sensor) not illustrated is disposed for recognizing the velocity of a transfer path 62a of the small-width conveyor 62, and the distance between a processing target S positioned in front and a processing target S positioned behind on the transfer path 62a.

The small-width conveyor 62 neighbors the downstream side of the third bias conveyor 46 along the X axis. An upstream end of the small-width conveyor 62 is formed to have a smaller width than the width of the downstream end of the third bias conveyor 46 in the width direction perpendicular to the extending direction D23. The width of the small-width conveyor 62 is set, for example, in accordance with the sizes of the processing targets S. The small-width conveyor 62 has such a width that a plurality of processing targets S having discretionary sizes are not arranged side by side. The small-width conveyor 62 includes, for example, by an endless belt, the transfer path 62a that is horizontal to the horizontal plane (the ground). An upstream end of the transfer path 62a of the small-width conveyor 62 is disposed at a position neighboring the downstream end in one direction of the width direction of the transfer path 46a of the third bias conveyor 46. A transfer direction C31 of the small-width conveyor 62 is parallel to an extending direction D31 of the small-width conveyor 62. Preferably, a transfer velocity V31 along the transfer direction C31 of the transfer path 62a of the small-width conveyor 62 is higher than the transfer velocity V23 along the transfer direction C23 of the transfer path 46a of the third bias conveyor 46.

An outer end portion 62b in one direction of the width direction perpendicular to the extending direction D31 (transfer direction C31) of the small-width conveyor 62 is provided with a fourth wall unit 68 that functions as a wall for preventing the processing target S from falling from one direction of the small-width conveyor 62. The fourth wall unit 68 extends, for example, in parallel to the extending direction D31 of the transfer path 62a of the small-width conveyor 62. The presence of the fourth wall unit 68 prevents the processing target S from falling from the small-width conveyor 62.

Note that it is preferable that the outer end portion 62b of the small-width conveyor 62 and the outer end portion 46b of the third bias conveyor 46 are located on a straight line along the X axis.

The fourth wall unit 68 includes an auxiliary transfer unit 68a that actively or passively transfers the processing target S along the extending direction D31 from the upstream side toward downstream side of the transfer path 62a of the small-width conveyor 62. The auxiliary transfer unit 68a of the fourth wall unit 68 is directed toward an inner end portion 62c in the other direction of the width direction perpendicular to the extending direction D23 of the small-width conveyor 62.

Here, a description is given of, by way of example, a case where the auxiliary transfer unit 68a of the fourth wall unit 68 actively transfers the processing target S along the fourth extending direction D31 from the upstream side toward downstream side of the transfer path 62a of the small-width conveyor 62.

The auxiliary transfer unit 68a is formed, for example, like the auxiliary transfer units 52a, 54a and 56a. Thus, a transfer surface 68b of the endless belt of the auxiliary transfer unit 68a moves the processing target S in parallel to the extending direction D31 from the upstream side to downstream side, for example, at the velocity V31.

Note that a horizontal component of the first transfer direction C1 of the first transfer path 14a and a horizontal component of the third transfer direction C32 of the third transfer path 18a are straight.

In addition, a regulation section passage detection sensor 103 is formed at a downstream end of the small-width conveyor 62.

The regulation section passage detection sensor 103 detects the processing target S that passes through the small-width conveyor 62 and is input to the velocity regulation conveyor 64.

Since the structure of the regulation section passage detection sensor 103 is similar to the structure of the first falling sign detection sensor 102a, a description thereof is omitted.

The velocity regulation conveyor 64 neighbors the downstream side of the small-width conveyor 62 along the X axis. A transfer path 64a of the velocity regulation conveyor 64 is properly controlled to be accelerated or decelerated in relation to the transfer velocity of the transfer path 62a of the small-width conveyor 62, in such a manner that the processing targets S placed on the transfer path 64a are spaced apart with a predetermined pitch.

An upstream end of the velocity regulation conveyor 64 is formed to have substantially the same width as the width in the width direction perpendicular to the extending direction D31 of the downstream end of the small-width conveyor 62. A transfer path 64a of the velocity regulation conveyor 64 is, for example, by an endless belt, horizontal to the horizontal plane (the ground). The transfer direction C32 of the velocity regulation conveyor 64 is parallel to the extending direction D32 of the velocity regulation conveyor 64. A transfer velocity V32 along the transfer direction C32 of the transfer path 64a of the velocity regulation conveyor 64 is controlled in such a manner that the processing targets C, which are arranged in one row, are spaced apart at a predetermined pitch. Thus, the transfer velocity V32 along the transfer direction C32 of the transfer path 64a of the velocity regulation conveyor 64 can be accelerated or decelerated.

An outer end portion 64b in one direction of the width direction perpendicular to the extending direction D32 (transfer direction C32) of the velocity regulation conveyor 64 is provided with a fifth wall unit 70 that functions as a wall for preventing the processing target S from falling from one direction of the velocity regulation conveyor 64. The fifth wall unit 70 extends, for example, in parallel to the extending direction D32 of the transfer path 64a of the velocity regulation conveyor 64. The presence of the fifth wall unit 70 prevents the processing target S from falling from the velocity regulation conveyor 64.

Note that it is preferable that the outer end portion 64b of the velocity regulation conveyor 64 and the outer end portion 62b of the small-width conveyor 62 are located on a straight line along the X axis.

The fifth wall unit 70 includes an auxiliary transfer unit 70a that actively or passively transfers the processing target S along the extending direction D32 from the upstream side toward downstream side of the transfer path 64a of the velocity regulation conveyor 64. The auxiliary transfer unit 70a of the fifth wall unit 70 is directed toward an inner end portion 64c in the other direction of the width direction perpendicular to the extending direction D32 of the velocity regulation conveyor 64.

The auxiliary transfer unit 70a may be formed as a transfer surface that actively transfers the processing target S, for example, like the transfer surfaces 52b, 54b, 56b and 68b of the auxiliary transfer units 52a, 54a, 56a and 68a. Here, the auxiliary transfer unit 70a includes a plurality of rollers 70b that passively rotate at a time of coming in contact with the processing target S. The rollers 70b in FIG. 3 are arranged, for example, in a grid shape or in one row. Each of the rollers 70b is formed in a spherical shape, and is freely rotatable at the position thereof.

Note that, like a roller (wheel) of a roller conveyor, the roller 70b may be formed in such a manner as to rotate around an axis parallel to the Z axis.

The recovery unit 66 neighbors the downstream end along the X axis of the transfer path 46a of the third bias conveyor 46 of the second transfer unit 16, and also neighbors the other direction (inner side) of the width direction of the small-width conveyor 62. The recovery unit 66 includes an inclined surface 72 and a guide 74.

The inclined surface 72 is formed as a planar surface or a curved surface. The inclined surface 72 becomes higher toward a position (first end portion 72a) near the small-width conveyor 62, and becomes lower toward a position (second end portion 72b) near the other direction of the width direction perpendicular to the horizontal component of the transfer direction C1 of the first transfer unit 14. The inclined surface 72 becomes higher toward a position (third end portion 72c) near the downstream end of the transfer path 46a of the third bias conveyor 46, and becomes lower toward a position (fourth end portion 72d) away from the downstream end of the transfer path 46a of the third bias conveyor 46 along the X axis direction. The processing target S placed on the inclined surface 72 slides toward the fourth end portion 72d of the inclined surface 72 by its own weight.

The first end portion 72a of the inclined surface 72 on the small-width conveyor 62 side may be continuous with the downstream end of the transfer path 62a of the small-width conveyor 62, or may be positioned with a step on the lower side of the downstream end of the transfer path 62a of the small-width conveyor 62.

The guide 74 is formed in a plate shape. The guide 74 is fixed to the second end portion 72b of the inclined surface 72. The guide 74 extends along the X axis direction. The guide 74 is formed to project upward from the second end portion 72b (the end portion near the other direction of the width direction perpendicular to the horizontal component of the transfer direction C1 of the first transfer unit 14) of the inclined surface 72.

As illustrated in FIG. 1 and FIG. 2, the supply apparatus 10 includes a fourth transfer unit 20 that neighbors the recovery unit 66 that recovers processing targets S in the third transfer unit 18, and transfers the processing targets S recovered by the recovery unit 66 toward the input conveyor 12.

The fourth transfer unit 20 includes, for example, a curve conveyor 92. The curve conveyor 92 is provided between the fourth end portion 72d of the inclined surface 72 of the recovery unit 66 and the input conveyor 12.

An upstream end of a transfer path 92a of the curve conveyor 92 neighbors the fourth end portion 72d of the inclined surface 72. A downstream end of the transfer path 92a of the curve conveyor 92 neighbors the input conveyor 12.

Note that the lengths along the extending directions D21, D22 and D23, the widths perpendicular to the extending directions D21, D22 and D23, and the angles θa, θb and θc of the first bias conveyor 42, second bias conveyor 44 and third bias conveyor 46 of the second transfer unit 16 are set, for example, in such a state that the processing target S existing at the inner end portion 42c of the downstream end of the transfer path 42a of the first bias conveyor 42, when having passed through the first bias conveyor 42, second bias conveyor 44 and third bias conveyor 46, comes in contact with the outer end portion 46b of the third bias conveyor 46, as will be described later.

Next, a control system of the supply apparatus 10 is described.

FIG. 5 is a block diagram illustrating a configuration example of the control system of the supply apparatus 10. As illustrated in FIG. 5, the supply apparatus 10 includes the processor 301, a memory 302, the photographing means 101, first falling sign detection sensor 102a, second falling sign detection sensor 102b, input conveyor 12, regulation section passage detection sensor 103, and velocity regulation conveyor 64.

The processor 301, memory 302, photographing means 101, first falling sign detection sensor 102a, second falling sign detection sensor 102b, input conveyor 12, regulation section passage detection sensor 103, and velocity regulation conveyor 64 are interconnected via an interface or a data bus.

The processor 301 controls the operation of the entirety of the supply apparatus 10. For example, the processor 301 is composed of a CPU or the like. In addition, the processor 301 may be composed of an ASIC (Application Specific Integrated Circuit) or the like. Besides, the processor 301 may be composed of an FPGA (Field Programmable Gate Array) or the like.

The memory 302 stores various data. For example, the memory 302 functions as a ROM, a RAM and a NVM.

For example, the memory 302 stores a control program and control data. The control program and control data are incorporated in advance in accordance with specifications of the supply apparatus 10. For example, the control program is a program that supports functions implemented by the supply apparatus 10.

In addition, the memory 302 temporarily stores data in the course of processing of the processor 301. Besides, the memory 302 may store data necessary for the execution of an application program, and an execution result of the application program.

The memory 302, photographing means 101, first falling sign detection sensor 102a, second falling sign detection sensor 102b, input conveyor 12, regulation section passage detection sensor 103, and velocity regulation conveyor 64 are as have been described above.

Next, the functions implemented by the supply apparatus 10 are described. The functions implemented by the supply apparatus 10 are implemented by the processor 301 executing the program stored in the memory 302 or the like.

To begin with, a description is given of an operation example in which the supply apparatus 10 spaces the processing targets S apart.

In the present embodiment, it is assumed that the transfer velocity along the first transfer direction C1 (C10, C11, C12) of the first transfer unit 14 is equal to the movement velocity of processing targets S that are in contact with the first transfer unit 14. Similarly, it is assumed that the transfer velocity along the second transfer directions C21, C22 and C23 of the second transfer unit 16 is equal to the movement velocity of processing targets S that are in contact with the second transfer unit 16 in the state in which the processing targets S are not in contact with the first wall unit 52, second wall unit 54 and third wall unit 56. It is assumed that the transfer velocity along the third transfer directions C31 and C32 of the third transfer unit 18 is equal to the movement velocity of processing targets S that are in contact with the third transfer unit 18 in the state in which the processing targets S are not in contact with the fourth wall unit 68 and fifth wall unit 70.

For example, a tipper is inclined, and processing targets S are input to the input conveyor 12. In place of the tipper, or together with the tipper, a robot or an operator may input the processing targets S to the input conveyor 12.

The processing targets S, which may be stacked in multiple layers in a scattered state in the input conveyor 12, successively move toward the upstream end of the transfer path 22a of the first conveyor 22 of the first transfer unit 14, for example, by the inclination or the like of the floor surface of the input conveyor 12.

At this time, the first conveyor 22 of the first transfer unit 14 takes out processing targets S, which come in contact with the transfer path 22a, by the transfer operation of the transfer path 22a, and spaces apart and separates the processing targets S while moving the processing targets S in the transfer direction C10. The processing targets S in contact with the transfer path 22a of the first conveyor 22 are transferred from the upstream side to downstream side. In accordance with the transferring motion of the transfer path 22a of the first conveyor 22, an upper-side processing target S that is placed over a lower-side processing target S slides relative to the lower-side processing target S in accordance with frictional force with the lower-side processing target S. Thus, some of processing targets S stacked in multiple layers are collapsed. In this manner, for example, some of processing targets S stacked in multiple layers are spaced apart and separated.

The processing targets S are transferred from the transfer path 22a of the first conveyor 22 onto the transfer path 32a of the first inclined conveyor 32 of the second conveyor unit 24.

The transfer path 32a of the first inclined conveyor 32 inclines as a downward slope. On an upper-side processing target S placed on, for example, a rectangular parallelepipedic processing target S that is in contact with the transfer path 32a of the first inclined conveyor 32, an inclination component to a horizontal direction, which is parallel to the upper surface of the processing target S, exerts an action. Thus, the upper-side processing target S placed on the processing target S that is in contact with the transfer path 32a tends to more easily slide relative to the processing target S in contact with the transfer path 32a, than in the case of the transfer path 22a of the first conveyor 22, which is horizontal.

The transfer velocity V11 of the transfer path 32a of the first inclined conveyor 32 is lower than the transfer velocity V10 of the transfer path 22a of the first conveyor 22. Thus, by a difference in transfer velocity between the horizontal transfer path 22a of the first conveyor 22 and the transfer path 32a of the first inclined conveyor 32, the processing target S that is in contact with the transfer path 32a enters a state of being braked, and the upper-side processing target S placed on the processing target S that is in contact with the transfer path 32a slides relative to the processing target S in contact with the transfer path 32a by the law of inertia, and thus the processing targets S stacked in multiple layers are collapsed.

Accordingly, by the inclined surface that is the transfer path 32a of the downward slope, and by the law of inertia, the processing targets S stacked in multiple layers are collapsed on the first inclined conveyor 32. Thus, for example, some of the processing targets S stacked in multiple layers are spaced apart and separated.

Note that, depending on the shape or the like of the processing target S that is in contact with the transfer path 32a of the first inclined conveyor 32, the processing target S that is in contact with the transfer path 32a of the first inclined conveyor 32 rolls, and the processing targets S stacked in multiple layers, for example, in two layers, are collapsed.

Some of the processing targets S, which are, for example, in the state of being stacked in multiple layers, are transferred from the transfer path 32a of the first inclined conveyor 32 of the second conveyor unit 24 onto the transfer path 34a of the second inclined conveyor 34 of the second conveyor unit 24.

The transfer path 34a of the second inclined conveyor 34 inclines as an upward slope. Thus, an upper-side processing target S placed on a processing target S that is in contact with the transfer path 34a tends to more easily slide relative to the processing target S in contact with the transfer path 34a, than in the case of the transfer path 22a of the first conveyor 22, which is horizontal.

The transfer velocity V12 of the transfer path 34a of the second inclined conveyor 34 is higher than the transfer velocity V11 of the transfer path 32a of the first inclined conveyor 32. Thus, by a difference in transfer velocity between the transfer path 32a of the first inclined conveyor 32 and the transfer path 34a of the second inclined conveyor 34, the processing target S that is in contact with the transfer path 34a enters a state of being accelerated, and the upper-side processing target S placed on the processing target S that is in contact with the transfer path 34a slides relative to the processing target S in contact with the transfer path 34a by the law of inertia, and thus the processing targets S stacked in multiple layers are collapsed.

Accordingly, by the inclined surface that is the transfer path 34a of the upward slope, and by the law of inertia, the processing targets S stacked in multiple layers are further collapsed on the second inclined conveyor 34. Thus, for example, some of the processing targets S stacked in multiple layers are spaced apart and separated.

In this manner, by the first conveyor 22 and the second conveyor unit 24, the processing targets S of multiple layers are collapsed and spaced apart one by one. The processing targets S of multiple layers may be the same kind of parts or different kinds of parts.

Then, the processing targets S are transferred from the second inclined conveyor 34 onto the first bias conveyor 42. By the step H between the second inclined conveyor 34 and the first bias conveyor 42, the processing targets S greatly move, when transferred from the second inclined conveyor 34 onto the first bias conveyor 42. At this time, the processing targets S are spaced apart by pulling, as if taking out, the processing targets along the transfer direction C21 by the first bias conveyor 42 on the downstream side of the second inclined conveyor 34.

Note that FIG. 3 illustrates the example in which the step H is provided between the second inclined conveyor 34 and the first bias conveyor 42. For example, a conveyor having a horizontal transfer path may be disposed between the second inclined conveyor 34 and the first bias conveyor 42, and the step H may be provided between the conveyor having the horizontal transfer path and the first bias conveyor 42.

On the transfer path 42a of the first bias conveyor 42, from the upstream side toward the downstream side, the processing targets S that are spaced apart one by one move in the transfer direction C21 that inclines with respect to the extending direction D21 of the first bias conveyor 42. Thus, the processing targets S are moved toward the first wall unit 52 on the transfer path 42a of the first bias conveyor 42. Hence, the distance in the width direction of the processing targets S is gradually narrowed from the upstream side toward downstream side. In addition, some of the processing targets S come in contact with the first wall unit 52 between the upstream end and downstream end of the transfer path 42a of the first bias conveyor 42.

The processing target S that comes in contact with the first wall unit 52 on the transfer path 42a of the first bias conveyor 42 moves in a direction along the extending direction D21 of the transfer path 42a at the velocity of V21·cos θa. The processing target S moves along the first wall unit 52, and is transferred from the transfer path 42a of the first bias conveyor 42 onto the transfer path 44a of the second bias conveyor 44. Thus, the auxiliary transfer unit 52a of the first wall unit 52 prevents the first wall unit 52 from hindering the movement of the processing target S when the processing target S comes in contact with the first wall unit 52.

On the transfer path 44a of the second bias conveyor 44, from the upstream side toward the downstream side, the processing targets S move in the transfer direction C22 that inclines with respect to the extending direction D22 of the second bias conveyor 44. At this time, the transfer direction of the processing targets S is changed from the direction along the extending direction D21 or the direction along the transfer direction C21 to a direction along the transfer direction C22. Thus, the processing targets S are moved toward the second wall unit 54 on the transfer path 44a of the second bias conveyor 44. Hence, the distance in the width direction of the processing targets S is gradually narrowed. In addition, some of the processing targets S come in contact with the second wall unit 54 between the upstream end and downstream end of the transfer path 44a of the second bias conveyor 44. Thus, the processing targets S become closer to a state of being one row.

The processing target S that comes in contact with the second wall unit 54 on the transfer path 44a of the second bias conveyor 44 moves in a direction along the extending direction D22 of the transfer path 44a at the velocity of V22·cos θb. The processing target S moves along the second wall unit 54, and is transferred from the transfer path 44a of the second bias conveyor 44 onto the transfer path 46a of the third bias conveyor 46. Thus, the auxiliary transfer unit 54a of the second wall unit 54 prevents the second wall unit 54 from hindering the movement of the processing target S when the processing target S comes in contact with the second wall unit 54.

On the transfer path 46a of the third bias conveyor 46, from the upstream side toward the downstream side, the processing targets S move in the transfer direction C23 that inclines with respect to the extending direction D23 of the third bias conveyor 46. At this time, the transfer direction of the processing targets S is changed from the direction along the extending direction D22 or the direction along the transfer direction C22 to a direction along the transfer direction C23. Thus, the processing targets S are moved toward the third wall unit 56 on the transfer path 46a of the third bias conveyor 46. Hence, the distance in the width direction of the processing targets S is gradually narrowed. In addition, some of the processing targets S come in contact with the third wall unit 56 between the upstream end and downstream end of the transfer path 46a of the third bias conveyor 46. The processing targets S are arranged in one row.

In this manner, while the processing targets S, which are transferred along the center in the width direction of the first transfer path 14a of the first transfer unit 14, are moving through the transfer path 42a of the first bias conveyor 42, the transfer path 44a of the second bias conveyor 44 and the transfer path 46a of the third bias conveyor 46, i.e., while the processing targets S are undergoing directional changes, the side-by-side arrangement state in the directions perpendicular to the extending directions D21, D22 and D23 gradually disappears. In addition, for example, on the transfer path 46a of the third bias conveyor 46, the processing targets S are arranged in one row. In this manner, the second transfer unit 16 aligns the processing targets S in one row, while moving the processing targets S toward in one direction of the width direction perpendicular to the extending directions D21, D22 and D23 of the second transfer path 16a having the U shape as a whole.

The processing target S that comes in contact with the third wall unit 56 on the transfer path 46a of the third bias conveyor 46 moves in a direction along the extending direction D23 of the transfer path 46a at the velocity of V23·cos θc. The processing target S moves along the third wall unit 56, and is transferred from the transfer path 46a of the third bias conveyor 46 onto the transfer path 62a of the small-width conveyor 62. Thus, the auxiliary transfer unit 56a of the third wall unit 56 prevents the third wall unit 56 from hindering the movement of the processing target S when the processing target S comes in contact with the third wall unit 56.

The transfer velocity V31 of the transfer path 62a of the small-width conveyor 62 is higher than V23·cos θc. Thus, the transfer path 62a of the small-width conveyor 62 increases the pitch of the processing targets S that are arranged in one row, when the processing targets S are transferred from the transfer path 46a of the third bias conveyor 46 onto the transfer path 62a of the small-width conveyor 62.

The processing target S that comes in contact with the fourth wall unit 68 on the transfer path 62a of the small-width conveyor 62 moves in a direction along the predetermined transfer direction C31 (extending D31) of the transfer path 62a at the velocity of V31. The processing target S moves along the fourth wall unit 68, and is transferred from the transfer path 62a of the small-width conveyor 62 onto the transfer path 62a of the small-width conveyor 62. Thus, the auxiliary transfer unit 68a of the fourth wall unit 68 prevents the fourth wall unit 68 from hindering the movement of the processing target S when the processing target S comes in contact with the fourth wall unit 68.

When the processing targets S are transferred from the transfer path 62a of the small-width conveyor 62 of the third transfer unit 18 onto the transfer path 64a of the velocity regulation conveyor 64 of the third transfer unit 18, the transfer velocity V32 of the transfer path 64a of the velocity regulation conveyor 64 of the third transfer unit 18 is appropriately controlled, for example, based on the information of the processing target S positioned in front and the processing target S positioned behind on the transfer path 62a, which are recognized by, for example, a camera. Specifically, the acceleration and deceleration of the transfer velocity V32 along the predetermined transfer direction C32 (extending direction D32) of the transfer path 64a of the velocity regulation conveyor 64 of the third transfer unit 18 are controlled, and the processing targets S arranged in one row are spaced apart with a predetermined pitch on the transfer path 64a of the velocity regulation conveyor 64 of the third transfer unit 18.

The processing targets S arranged in one row and spaced apart with the predetermined pitch are input to a device on the downstream side of the third transfer unit 18.

When the processing target S is in contact with the rollers 70b of the auxiliary transfer unit 70a, the rollers 70b of the auxiliary transfer unit 70a rotate at the positions thereof, and move the processing target S from the upstream side to downstream side at the velocity V32 of the transfer path 64a of the velocity regulation conveyor 64 of the third transfer unit 18 in parallel to the extending direction D32. Thus, the auxiliary transfer unit 70a of the fifth wall unit 70 prevents the friction between the fifth wall unit 70 and the processing target S from hindering the movement of the processing target S.

In the transfer path 46a of the third bias conveyor 46, there is a possibility that the processing targets S are not arranged in one row and are arranged in the width direction perpendicular to the extending direction D23 of the third bias conveyor 46 in the transfer path 46a of the third bias conveyor 46. Among the processing targets S that are not arranged in one row in the transfer path 46a of the third bias conveyor 46, the processing target S that is distant from the third wall unit 56 in the width direction is not transferred from the downstream end of the transfer path 46a of the third bias conveyor 46 onto the transfer path 62a of the small-width conveyor 62, but is transferred onto the inclined surface 72 of the fourth transfer unit 20. Thus, the processing target S reaches the fourth end portion 72d of the inclined surface 72, while sliding on the area near the boundary between the inclined surface 72 and the guide 74.

The processing target S that has reached the fourth end portion 72d of the inclined surface 72 is transferred to the input conveyor 12 by the curve conveyor 92. In this manner, the recovery unit 66 and the fourth transfer unit 20 transfer the processing target S that failed to be moved in one direction in the second transfer unit 16, among the processing targets S, toward the first transfer unit 14. Thus, the recovery unit 66 can recover, among the processing targets S, some of the processing targets S that are moved in one direction in the second transfer unit 16. Therefore, the processing target S, which is recovered by the recovery unit 66 and transferred from the fourth transfer unit 20 to the input conveyor 12, is transferred once again from the input conveyor 12 through the first transfer unit 14, second transfer unit 16 and third transfer unit 18, is arranged with a predetermined pitch in relation to other processing targets S, and is input to the device on the downstream side of the third transfer unit 18.

In this manner, the first transfer unit 14 of the supply apparatus 10 according to the present embodiment is used as a separate stage that spaces apart, one by one, the processing targets S stacked in a scattered state. The second transfer unit 16 is used as an arrange stage that aligns the processing targets S, which are spaced apart one by one, in one row. The third transfer unit 18 is used as an adjust stage that spaces apart the processing targets S, which are aligned in one row, with a predetermined pitch. In addition, the supply apparatus 10 according to the present embodiment successively transfers the processing targets S through the first transfer unit 14, second transfer unit 16 and third transfer unit 18, and can transfer the processing targets S to some other device.

Next, a description is given of a function by which the supply apparatus 10 drives and stops the input conveyor 12.

To begin with, the processor 301 of the supply apparatus 10 includes a function of photographing the first conveyor 22 by using the photographing means 101.

Upon starting the operation of spacing the processing targets S apart, the processor 301 causes the photographing means 101 to start photography. Upon causing the photographing means 101 to start photography, the processor 301 acquires a photographed image (photography image) from the photographing means 101. The processor 301 acquires the photography image from the photographing means 101 in real time.

FIG. 6 is a view illustrating an example of a photography image that the processor 301 acquired. As illustrated in FIG. 6, the photography image is an image captured by photographing the first conveyor 22 from above. The photography image includes processing targets S placed on the first conveyor 22. The photography image may include the input conveyor 12 (a left end of FIG. 6) and the first inclined conveyor 32 (a right end of FIG. 6).

In addition, the processor 301 includes a function of calculating a ratio (area ratio) of an area occupied by the processing targets S in the photography image.

Here, the processor 301 divides the photography image into a plurality of regions, and calculates the area ratio in each region. FIG. 7 illustrates an operation example in which the processor 301 calculates the area ratio.

Upon acquiring the photography image, the processor 301 sets an area ratio detection region 201 that is a target of calculation of the area ratio in the photography image. Here, the area ratio detection region 201 includes a region in which the first conveyor 22 appears.

Upon setting the area ratio detection region 201, the processor 301 divides the area ratio detection region 201 into a plurality of regions (divisional regions) in a grid shape. Here, the processor 301 divides the area ratio detection region 201 into six regions in the X axis direction and four regions in the Y axis direction.

Upon dividing the area ratio detection region 201, the processor 301 extracts, according to a predetermined image processing algorithm, regions (target regions, article regions) where the processing targets S appear in the area ratio detection region 201. In the example illustrated in FIG. 7, the processor 301 extracts, as the target regions, regions indicated by hatching.

Upon extracting the target regions, the processor 301 calculates the area of the target region overlapping each divisional region. For example, the processor 301 calculates the number of dots of the target region in each divisional region.

Upon calculating the area of the target region overlapping each divisional region, the processor 301 divides, in regard to each divisional region, the calculated area by the area of the divisional region, and calculates the area ratio in each divisional region. For example, the processor 301 calculates the area ratio by dividing the number of dots of the target region overlapping each divisional region by the number of dots of the divisional region.

Here, the processor 301 acquires an area ratio group AR including area ratios in the respective divisional regions.

In addition, the processor 301 includes a function of stopping the input conveyor 12, based on the area ratio group AR.

FIG. 8 illustrates an operation example in which the processor 301 stops the input conveyor 12. As illustrated in FIG. 8, the area ratio group AR is composed of area ratios AR1 to AR24 in the respective divisional regions. Here, the area ratios AR1 to AR24 correspond to the divisional regions in order in the X axis direction and Y axis direction. For example, the area ratios AR1 to AR4 correspond to the divisional regions in a first column in order in the Y direction.

Here, the processor 301 sets regions 401 to 403 in a region where the first conveyor 22 appears.

The region 401 is a region where the processing target S protruding from the input conveyor 12 appears. The region 402 (falling region) is a region where the processing target S falls from the input conveyor 12. In other words, the region 402 is a region to which the processing target S is supplied if the input conveyor 12 is driven.

The region 403 (placement region) is a region where a processing target group GS placed on the first conveyor 22 appears. In other words, the region 403 is a region where the processing target group GS that the first conveyor 22 supplies to the downstream appears.

The processor 301 determines whether or not to stop the input conveyor 12, based on the area ratio in the region 402.

For example, the processor 301 acquires area ratios (here, area ratios AR5 to AR12) of the divisional regions in the region 402. Upon acquiring the area ratios, the processor 301 calculates an average value (partial average area ratio) of the acquired area ratios.

Upon calculating the partial average area ratio, the processor 301 determines whether the partial average area ratio is equal to or greater than a predetermined threshold (stop determination threshold). For example, the stop determination threshold is 30% to 70%.

If the processor 301 determines that the partial average area ratio is equal to or greater than the stop determination threshold, the processor 301 stops the input conveyor 12.

In addition, if the processor 301 determines that the partial average area ratio is less than the stop determination threshold, the processor 301 maintains the driving of the input conveyor 12. Besides, in a case where the input conveyor 12 is stopped, the processor 301 drives the input conveyor 12.

Note that the processor 301 may determine whether or not to stop the input conveyor 12, based on the total of the area ratios of the divisional regions in the region 402.

Besides, the processor 301 may determine whether or not to stop the input conveyor 12, based on the area ratios of the divisional regions in another region.

In addition, the processor 301 includes a function of estimating a time (downstream transfer time T1) during which the processing target group GS is transferred from the small-width conveyor 62 to the velocity regulation conveyor 64.

FIG. 9 is a view for describing the downstream transfer time T1. FIG. 9 illustrates a state of the processing target group GS placed on the small-width conveyor 62 and velocity regulation conveyor 64 at time t, and a state of the processing target group GS placed on the small-width conveyor 62 and velocity regulation conveyor 64 at time t+downstream transfer time T1.

At time t, the processing target group GS is in a state of being spaced apart by the first transfer unit 14 and second transfer unit 16. In addition, at time t, the foremost processing target S of the processing target group GS has reached the downstream end of the small-width conveyor 62. In other words, at time t, the small-width conveyor 62 starts the transfer of the processing target group GS to the velocity regulation conveyor 64.

At time t+downstream transfer time T1, the rearmost processing target S of the processing target group GS has been transferred from the small-width conveyor 62 to the velocity regulation conveyor 64. In other words, at time t+downstream transfer time T1, the transfer of the processing target group GS to the velocity regulation conveyor 64 is completed.

In addition, at time t+downstream transfer time T1, the width between an upstream end of the rearmost processing target S and an upstream end of the small-width conveyor 62 is a predetermined width (target pitch P). In other words, at time t+downstream transfer time T1, a predetermined distance is provided between the rearmost processing target S and a following processing target S.

As described above, the downstream transfer time T1 is a time during which the spaced-apart processing target group GS passes through the upstream end of the small-width conveyor 62 (here, a time to which the time of forming the target pitch is further added). In other words, the downstream transfer time T1 is a value acquired by dividing the length of the spaced-apart processing target group GS (here, the length including the target pitch) by the transfer velocity of the small-width conveyor 62.

The processor 301 calculates the downstream transfer time T1, based on the area ratio in the region 403.

For example, the processor 301 acquires the area ratios (here, the area ratios AR5 to AR24) of the divisional regions in the region 402. Upon acquiring the area ratios, the processor 301 inputs the acquired area ratios to a model (transfer time estimation model) that estimates the downstream transfer time T1, and calculates the downstream transfer time T1.

The transfer time estimation model is prestored in the memory 302 or the like.

For example, the transfer time estimation model is a multiple regression model in which the area ratio of the divisional region in the region 402 is an explanatory variable, and the actual time, during which the processing target group GS is transferred from the small-width conveyor 62 to the velocity regulation conveyor 64, is an objective variable. The transfer time estimation model is generated based on the explanatory variable and objective variable collected in advance.

Note that the transfer time estimation model may be a model acquired by machine learning such as a neural network.

The configuration of the transfer time estimation model is not limited to a specific configuration.

In addition, the processor 301 includes a function of predicting a time (falling wait time T2) during which the processing target group GS falls from the input conveyor 12 onto the first conveyor 22 in a case where the input conveyor 12 is driven from the stopped state.

The falling wait time T2 is a time from when the input conveyor 12 is driven until when the processing targets S fall onto the first conveyor 22 and an average value of the area ratio group AR (or a partial area ratio of the region 402, 403, or the like) becomes equal to or greater than a falling determination threshold. For example, the falling determination threshold is about 5% to 20%.

The processor 301 acquires detection results from the first falling sign detection sensor 102a and second falling sign detection sensor 102b. Here, the processor 301 acquires a first detection result from the first falling sign detection sensor 102a and a second detection result from the second falling sign detection sensor 102b.

Upon acquiring the first detection result and second detection result, the processor 301 calculates the falling wait time T2 by inputting the first detection result and second detection result to a model (wait time estimation model) that estimates the falling wait time T2.

The wait time estimation model is prestored in the memory 302 or the like.

For example, the wait time estimation model is a statistical model (for example, a normal distribution or the like) based on the first detection result and second detection result acquired in advance and the actual fall wait time.

Note that the wait time estimation model may be a model (network) acquired by machine learning.

The configuration of the wait time estimation model is not limited to a specific configuration.

In addition, the processor 301 includes a function of setting a time (stop time) during which the input conveyor 12 is stopped, based on the estimated downstream transfer time T1 and falling wait time T2.

The processor 301 sets the stop time of the input conveyor 12 in such a manner that the processing target S falls from the input conveyor 12 onto the first conveyor 22 at a timing when the downstream transfer time T1 has passed since the input conveyor was stopped. In other words, the processor 301 sets, as the stop time, a time acquired by subtracting the falling wait time T2 from the downstream transfer time T1.

For example, the processor 301 sets the stop time in a timer Tr. Upon setting the stop time in the timer Tr, the processor 301 updates the timer Tr (remaining time), based on an elapsed time. If the timer Tr reaches 0, the processor 301 returns to the operation of photographing the first conveyor 22.

Here, even if the timer Tr reaches 0, the processor 301 does not immediately drive the input conveyor 12. Thereby, the processor 301 can appropriately continue the stop of the input conveyor 12, even in a case where the processing target S falls from the input conveyor 12 onto the first conveyor 22 due to an operator, vibration, or the like while the input conveyor 12 is being stopped.

Next, an operation example of the supply apparatus 10 is described.

FIG. 10 is a flowchart for describing an operation example of the supply apparatus 10.

To start with, the processor 301 of the supply apparatus 10 starts the operation of spacing the processing targets S apart (S11). Here, the processor 301 also starts the driving of the input conveyor 12.

Upon starting the operation of spacing the processing targets S apart, the processor 301 acquires a photography image from the photographing means 101 (S12). Upon acquiring the photography image, the processor 301 extracts the target region from the photography image (S13).

Upon extracting the target region, the processor 301 calculates the area ratio group AR, based on the target region or the like (S14). Upon calculating the area ratio group AR, the processor 301 calculates the partial average area ratio, based on the area ratio group AR (S15).

Upon calculating the partial average area ratio, the processor 301 determines whether the partial average area ratio is equal to or greater than the stop determination threshold (S16). If the processor 301 determines that the partial average area ratio is equal to or greater than the stop determination threshold (S16, YES), the processor 301 stops the input conveyor 12 (S17).

Upon stopping the input conveyor 12, the processor 301 estimates the downstream transfer time T1, based on the area ratio group AR (S18). Upon estimating the downstream transfer time T1, the processor 301 estimates the falling wait time T2, based on the first detection result and second detection result (S19).

Upon estimating the falling wait time T2, the processor 301 sets the stop time in the timer Tr, based on the downstream transfer time T1 and the falling wait time T2 (S20). Upon setting the stop time in the timer Tr, the processor 301 updates the timer Tr (S21). Upon updating the timer Tr, the processor 301 determines whether the timer Tr is 0 or not (S22).

If the processor 301 determines that the timer Tr is not 0 (S22, NO), the processor 301 returns to S21.

If the processor 301 determines that the timer Tr is 0 (S22, YES), the processor 301 returns to S12.

If the processor 301 determines that the partial average area ratio is less than the stop determination threshold (S16, NO), the processor 301 drives the input conveyor 12 (S23). Upon driving the input conveyor 12, the processor 301 returns to S12.

Note that the processor 301 may discretely or continuously lower the transfer velocity of the input conveyor 12, instead of stopping the input conveyor 12.

Additionally, the processor 301 may divide the area ratio detection region 201 in either the X axis direction or the Y axis direction. In other words, the processor 301 may divide the area ratio detection region 201 in either the row direction or the column direction. Besides, the processor 301 may not divide the area ratio detection region 201 in the grid shape. The shape of divisional regions is not limited to a specific configuration.

Additionally, the supply apparatus 10 may include photographing means that performs photography from a direction perpendicular to the transfer direction of the first conveyor 22 and the vertical direction. In other words, the supply apparatus 10 may include photographing means that photographs the processing target S from the lateral side. In this case, also based on the photography image from the lateral side, the processor 301 may determine whether or not to stop the input conveyor 12, and/or may estimate the downstream transfer time T1. Besides, either or both of the photographing means may be composed of a line sensor, or fiber sensors arranged in an array, or the like.

Additionally, the supply apparatus 10 may include a distance sensor that measures a distance from each point of the first conveyor 22. In this case, also based on the detection result of the distance sensor, the processor 301 may determine whether or not to stop the input conveyor 12, and/or may estimate the downstream transfer time T1. Besides, the supply apparatus 10 may include the distance sensor in place of the photographing means 101.

Additionally, the processor 301 may not stop the input conveyor 12, in a case where the first falling sign detection sensor 102a and second falling sign detection sensor 102b do not detect the processing target S at a time when the partial average area ratio is determined to be equal to or greater than the stop determination threshold. In this case, the processor 301 continues the driving of the input conveyor 12 until either or both of the first falling sign detection sensor 102a and second falling sign detection sensor 102b detect the processing target S. Besides, in this case, the processor 301 continues the update of the timer Tr from a time point when the partial average area ratio is determined to be equal to or greater than the stop determination threshold.

Additionally, the processor 301 may set, as the stop time, the time acquired by subtracting the falling wait time T2 from the downstream transfer time T1, and the time acquired by subtracting the processing time of S18 and S19.

Additionally, the processor 301 may update the transfer time estimation model and/or the wait time estimation model, based on data acquired during operation. For example, the processor 301 may update the transfer time estimation model, based on the detection signal from the regulation section passage detection sensor 103.

Additionally, the processor 301 may detect a sign of falling from the input conveyor 12, based on the photography image from the photographing means 101. In this case, the photography region 101A of the photographing means 101 includes a detection region for detecting a sign of falling (for example, the downstream end of the input conveyor 12, or the upstream end of the first conveyor 22). The processor 301 calculates the area ratio in the detection region. Upon calculating the area ratio, the processor 301 sets two thresholds in regard to the calculated area ratio. The processor 301 compares the area ratio with each threshold, and acquires comparison results as the first detection result and second detection result.

The supply apparatus with the above-described configuration stops the input conveyor if processing targets accumulate on the first conveyor. The supply apparatus stops the input conveyor until the downstream transfer time of the processing target group passes after the input conveyor is stopped. As a result, at a timing when the input of the processing target group to the velocity regulation conveyor is completed, the supply apparatus can input subsequent processing targets to the velocity regulation conveyor. Therefore, the supply apparatus can reduce non-uniformity of a throughput.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A supply apparatus comprising:
an input conveyor configured to input an article;
a receiving conveyor configured to receive the article that the input conveyor inputs;
a camera configured to photograph the article placed on the receiving conveyor; and
a processor configured to:
extract an article region where the article appears, from a photography image that the camera photographs;
calculate an area ratio that the article region indicates in the photography image, based on the article region;
stop the input conveyor, based on the area ratio; and
set a stop time for stopping the input conveyor, based on the area ratio, wherein the processor is configured to:
set an area ratio detection region including the receiving conveyor in the photography image;
divide the area ratio detection region into a plurality of divisional regions;
calculate, as the area ratio, an area ratio in each of the divisional regions; and
stop the input conveyor, based on the area ratio of the divisional region in a falling region where the article falls from the input conveyor.

2. The supply apparatus of claim 1, wherein the processor is configured to set the stop time, based on the area ratio of the divisional region in a placement region where the article placed on the receiving conveyor appears.

3. The supply apparatus of claim 1, wherein the processor is configured to stop the input conveyor, in a case where an average value of the area ratios of the divisional regions in the falling region is equal to or greater than a predetermined threshold.

4. The supply apparatus of claim 3, wherein the processor is configured to set the stop time, based on the area ratio of the divisional region in a placement region where the article placed on the receiving conveyor appears.

5. A supply apparatus comprising:

an input conveyor configured to input an article;

a receiving conveyor configured to receive the article that the input conveyor inputs;

a camera configured to photograph the article placed on the receiving conveyor; and a processor configured to:

extract an article region where the article appears, from a photography image that the camera photographs;

calculate an area ratio that the article region indicates in the photography image, based on the article region;

stop the input conveyor, based on the area ratio; and set a stop time for stopping the input conveyor, based on the area ratio, wherein the processor is configured to:

set an area ratio detection region including the receiving conveyor in the photography image;

divide the area ratio detection region into a plurality of divisional regions;

calculate, as the area ratio, an area ratio in each of the divisional regions; and set the stop time, based on the area ratio of the divisional region in a placement region where the article placed on the receiving conveyor appears.

6. The supply apparatus of claim 5, further comprising a downstream conveyor configured to transfer the articles that are spaced apart, wherein the processor is configured to:

estimate a downstream transfer time during which the article placed on the receiving conveyor passes through the downstream conveyor, based on the area ratio of the divisional region in the placement region; and set the stop time, based on the downstream transfer time.

7. The supply apparatus of claim 6, wherein the processor is configured to:

estimate a falling wait time from when the input conveyor is driven until when the article falls onto the receiving conveyor, based on a detection result of detection of a sign of falling from the input conveyor to the receiving conveyor; and set the stop time, also based on the falling wait time.

8. The supply apparatus of claim 7, further comprising a falling sign detection sensor configured to detect a sign of falling from the input conveyor to the receiving conveyor, and to output a result of the detection.

9. The supply apparatus of claim 7, wherein the processor is configured to set, as the stop time, a time acquired by subtracting the falling wait time from the downstream transfer time.

10. The supply apparatus of claim 9, further comprising a falling sign detection sensor configured to detect a sign of falling from the input conveyor to the receiving conveyor, and to output a result of the detection.

11. The supply apparatus of claim 10, wherein the falling sign detection sensor includes a first falling sign detection sensor configured to detect the article placed at a predetermined position on the input conveyor, and a second falling sign detection sensor configured to detect the article placed at a position further on an upstream side than the predetermined position, and the result of the detection includes a first detection result from the first falling sign detection sensor, and a second detection result from the second falling sign detection sensor.

* * * * *